(12) United States Patent
Suciu et al.

(10) Patent No.: US 8,267,349 B2
(45) Date of Patent: Sep. 18, 2012

(54) ENGINE MOUNT SYSTEM FOR A TURBOFAN GAS TURBINE ENGINE

(75) Inventors: Gabriel L. Suciu, Glastonbury, CT (US); Brian D. Merry, Andover, CT (US); Christopher M. Dye, South Windsor, CT (US); Steven B. Johnson, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/336,140

(22) Filed: Dec. 23, 2011

(65) Prior Publication Data

US 2012/0099963 A1  Apr. 26, 2012

Related U.S. Application Data

(63) Continuation of application No. 12/131,876, filed on Jun. 2, 2008, now Pat. No. 8,128,021.

(51) Int. Cl.
*B64D 27/00* (2006.01)
(52) U.S. Cl. .......................................... 244/54; 248/555
(58) Field of Classification Search .................... 244/54; 60/796, 797; 248/555, 554
See application file for complete search history.

(56) References Cited

OTHER PUBLICATIONS

U.S. Appl. No. 11/832,107, dated Aug. 1, 2007, Engine Mounting Configuration for a Turbofan Gas Turbine Engine.

*Primary Examiner* — Christopher P Ellis
(74) *Attorney, Agent, or Firm* — Carlson, Gaskey & Olds P.C.

(57) ABSTRACT

A gas turbine engine according to an exemplary aspect of the present invention includes a gear train defined along an engine centerline axis, and a spool along the engine centerline axis which drives the gear train, the spool includes a low stage count low pressure turbine.

12 Claims, 11 Drawing Sheets

ENGINE MOUNT SYSTEM FOR A TURBOFAN GAS TURBINE ENGINE

CROSS REFERENCE TO RELATED APPLICATIONS

The present disclosure is a continuation of U.S. patent application Ser. No. 12/131,876, filed Jun. 2, 2008 now U.S. Pat. No. 8,128,021.

BACKGROUND

The present invention relates to a gas turbine engine and more particularly to an engine mounting configuration for the mounting of a turbofan gas turbine engine to an aircraft pylon.

A gas turbine engine may be mounted at various points on an aircraft such as a pylon integrated with an aircraft structure. An engine mounting configuration ensures the transmission of loads between the engine and the aircraft structure. The loads typically include the weight of the engine, thrust, aerodynamic side loads, and rotary torque about the engine axis. The engine mount configuration must also absorb the deformations to which the engine is subjected during different flight phases and the dimensional variations due to thermal expansion and retraction.

One conventional engine mounting configuration includes a pylon having a forward mount and an aft mount with relatively long thrust links which extend forward from the aft mount to the engine intermediate case structure. Although effective, one disadvantage of this conventional type mounting arrangement is the relatively large "punch loads" into the engine cases from the thrust links which react the thrust from the engine and couple the thrust to the pylon. These loads tend to distort the intermediate case and the low pressure compressor (LPC) cases. The distortion may cause the clearances between the static cases and rotating blade tips to increase which may negatively affect engine performance and increase fuel burn.

SUMMARY

A gas turbine engine according to an exemplary aspect of the present invention includes a gear train defined along an engine centerline axis, and a spool along the engine centerline axis which drives the gear train, the spool includes a low stage count low pressure turbine.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1A:
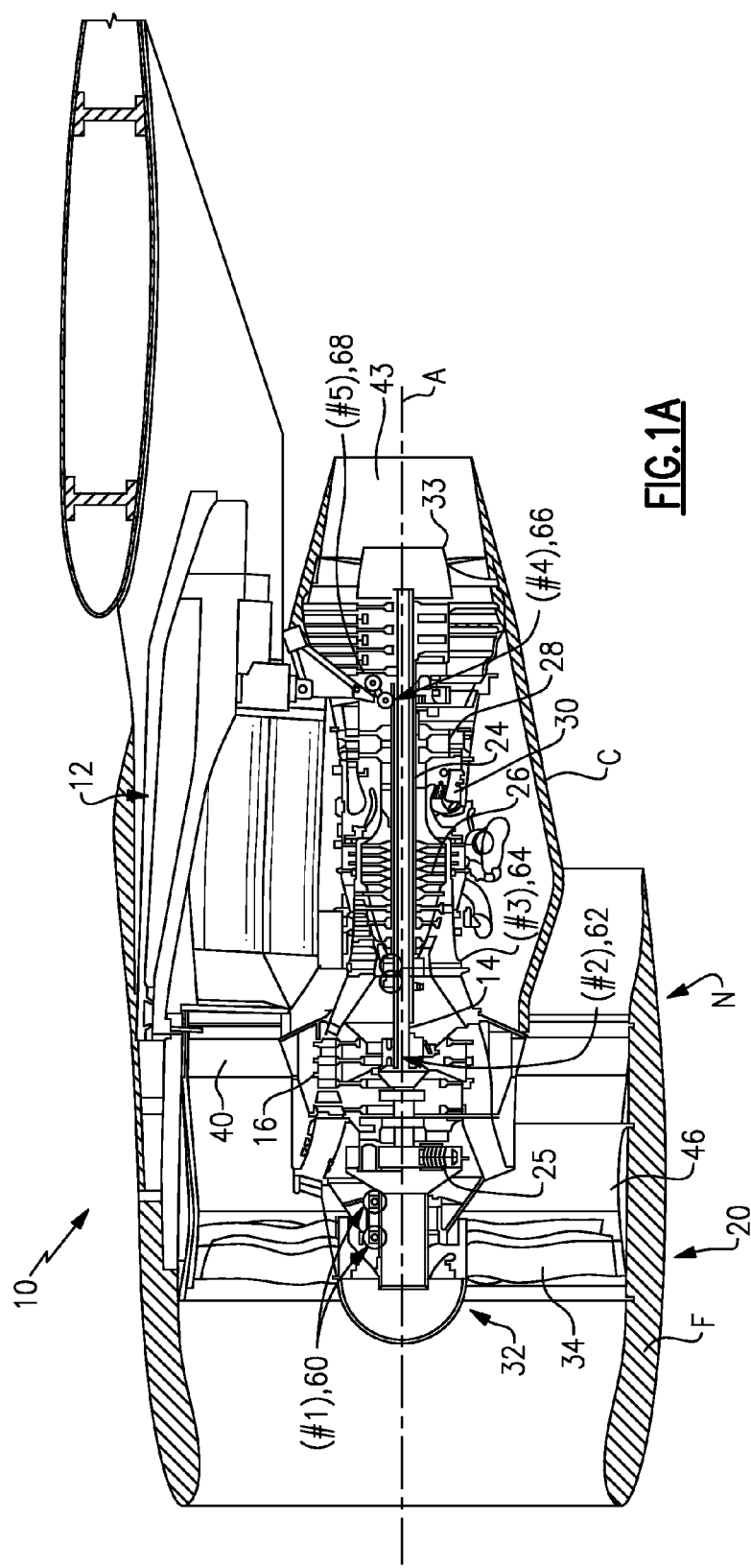
FIG. 1A is a general schematic sectional view through a gas turbine engine along the engine longitudinal axis.

FIG. 1A illustrates a general partial fragmentary schematic view of a gas turbofan engine 10 suspended from an engine pylon 12 within an engine nacelle assembly N as is typical of an aircraft designed for subsonic operation.

The turbofan engine 10 includes a core engine within a core nacelle C that houses a low spool 14 and high spool 24. The low spool 14 includes a low pressure compressor 16 and low pressure turbine 18. The low spool 14 drives a fan section 20 connected to the low spool 14 either directly or through a gear train 25.

The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-limiting embodiment is a high-bypass geared architecture aircraft engine. In one disclosed embodiment, the engine 10 bypass ratio is greater than ten (10:1), the turbofan diameter is significantly larger than that of the low pressure compressor 16, and the low pressure turbine 18 has a pressure ratio that is greater than 5:1. The gear train 25 may be an epicycle gear train such as a planetary gear system or other gear system with a gear reduction ratio of greater than 2.5:1. It should be understood, however, that the above parameters are only exemplary of one embodiment of a geared architecture engine and that the present invention is applicable to other gas turbine engines including direct drive turbofans.

Airflow enters the fan nacelle F which at least partially surrounds the core nacelle C. The fan section 20 communicates airflow into the core nacelle C to the low pressure compressor 16. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through gear train 25. A core engine exhaust E exits the core nacelle C through a core nozzle 43 defined between the core nacelle C and a tail cone 33.

Figure 1B:
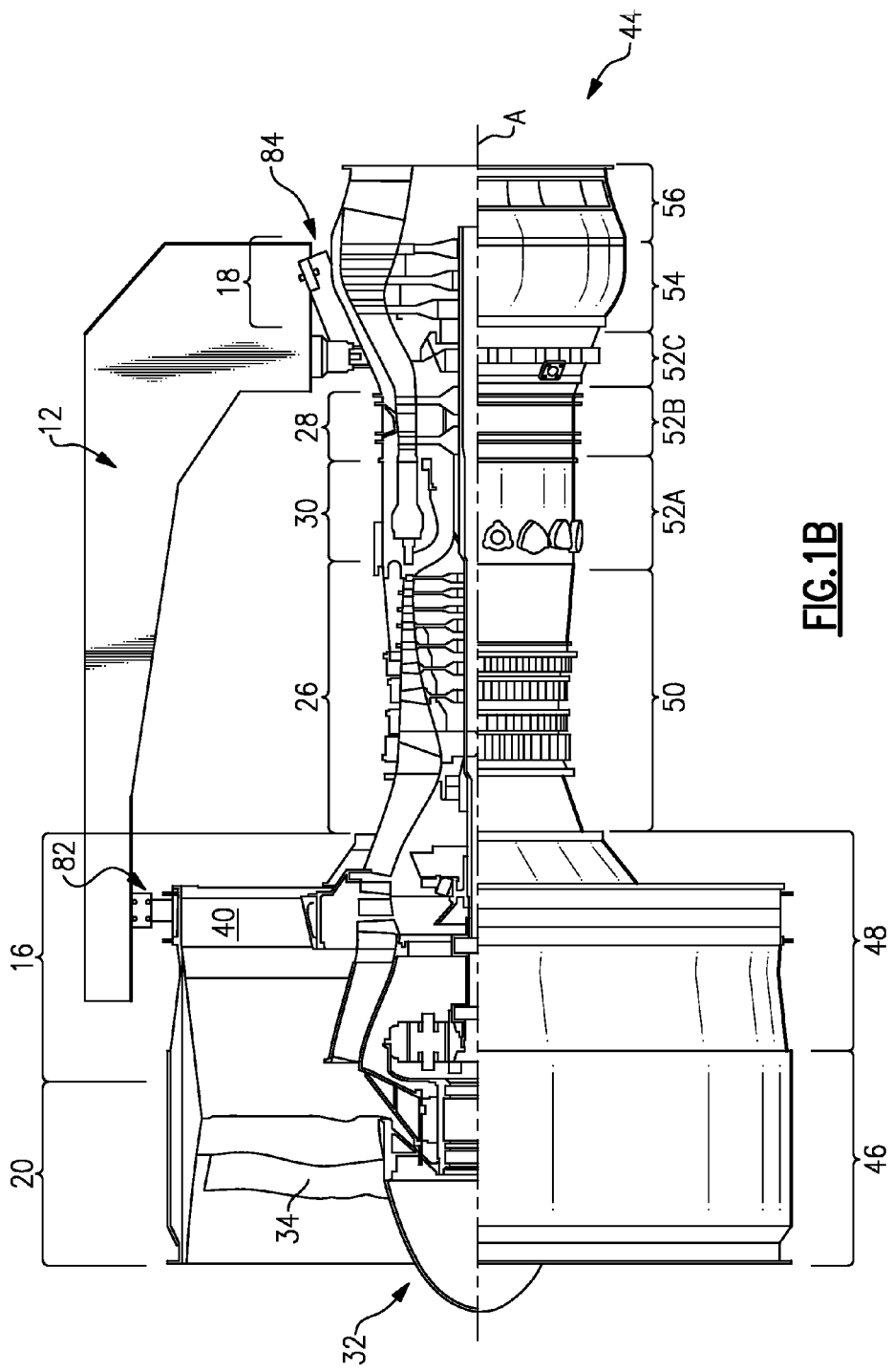
FIG. 1B is a general sectional view through a gas turbine engine along the engine longitudinal axis illustrating an engine static structure case arrangement on the lower half thereof.

The engine static structure 44 generally has sub-structures including a case structure often referred to as the engine backbone. The engine static structure 44 generally includes a fan case 46, an intermediate case (IMC) 48, a high pressure compressor case 50, a combustor case 52A, a high pressure turbine case 52B, a thrust case 52C, a low pressure turbine case 54, and a turbine exhaust case 56 (FIG. 1B). Alternatively, the combustor case 52A, the high pressure turbine case 52B and the thrust case 52C may be combined into a single case. It should be understood that this is an exemplary configuration and any number of cases may be utilized.

The fan section 20 includes a fan rotor 32 with a plurality of circumferentially spaced radially outwardly extending fan blades 34. The fan blades 34 are surrounded by the fan case 46. The core engine case structure is secured to the fan case 46 at the IMC 48 which includes a multiple of circumferentially spaced radially extending struts 40 which radially span the core engine case structure and the fan case 20.

The engine static structure 44 further supports a bearing system upon which the turbines 28, 18, compressors 26, 16 and fan rotor 32 rotate. A #1 fan dual bearing 60 which rotationally supports the fan rotor 32 is axially located generally within the fan case 46. The #1 fan dual bearing 60 is preloaded to react fan thrust forward and aft (in case of surge). A #2 LPC bearing 62 which rotationally supports the low spool 14 is axially located generally within the intermediate case (IMC) 48. The #2 LPC bearing 62 reacts thrust. A #3 fan dual bearing 64 which rotationally supports the high spool 24 and also reacts thrust. The #3 fan bearing 64 is also axially located generally within the IMC 48 just forward of the high pressure compressor case 50. A #4 bearing 66 which rotationally supports a rear segment of the low spool 14 reacts only radial loads. The #4 bearing 66 is axially located generally within the thrust case 52C in an aft section thereof. A #5 bearing 68 rotationally supports the rear segment of the low spool 14 and reacts only radial loads. The #5 bearing 68 is axially located generally within the thrust case 52C just aft of the #4 bearing 66. It should be understood that this is an exemplary configuration and any number of bearings may be utilized.

Figure 1C:
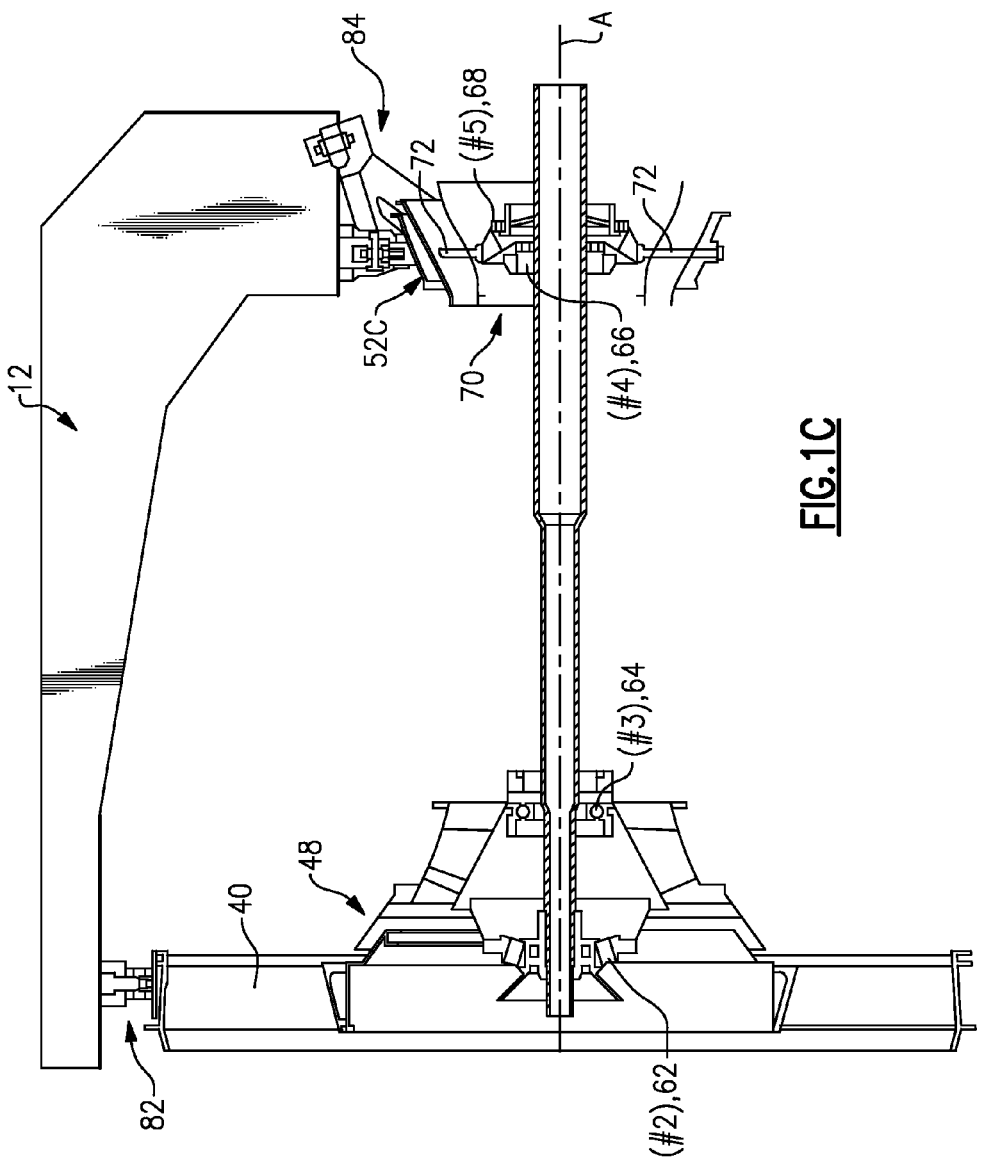
FIG. 1C is a side view of an mount system illustrating a rear mount attached through an engine thrust case to a mid-turbine frame between a first and second bearing supported thereby.
Figure 1D:
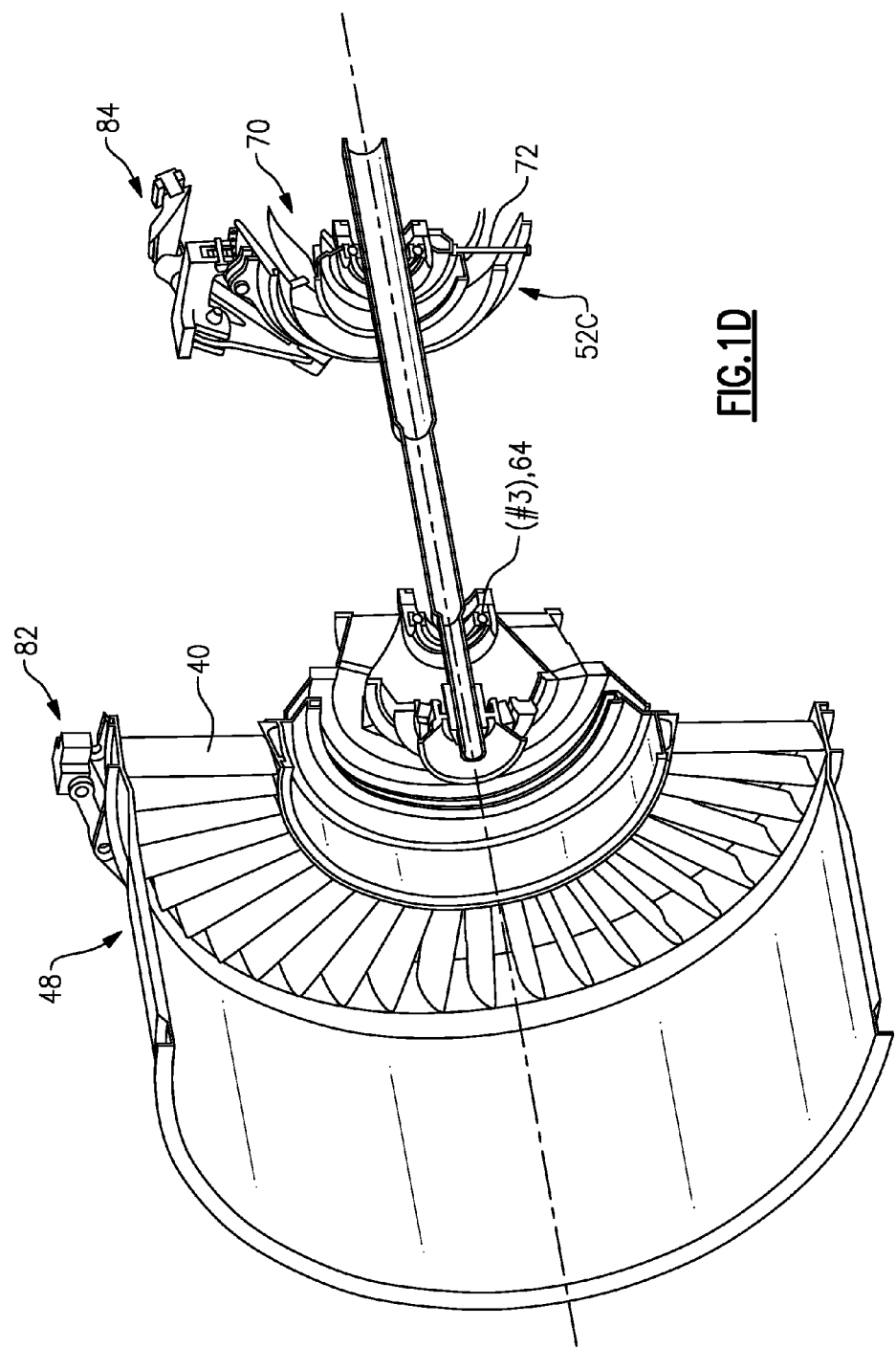
FIG. 1D is a forward perspective view of an mount system illustrating a rear mount attached through an engine thrust case to a mid-turbine frame between a first and second bearing supported thereby.

The #4 bearing 66 and the #5 bearing 68 are supported within a mid-turbine frame (MTF) 70 to straddle radially extending structural struts 72 which are preloaded in tension (FIGS. 1C-1D). The MTF 70 provides aft structural support within the thrust case 52C for the #4 bearing 66 and the #5 bearing 68 which rotatably support the spools 14, 24.

A dual rotor engine such as that disclosed in the illustrated embodiment typically includes a forward frame and a rear frame that support the main rotor bearings. The intermediate case (IMC) 48 also includes the radially extending struts 40 which are generally radially aligned with the #2 LPC bearing 62 (FIG. 1B). It should be understood that various engines with various case and frame structures will benefit from the present invention.

Figure 2A:
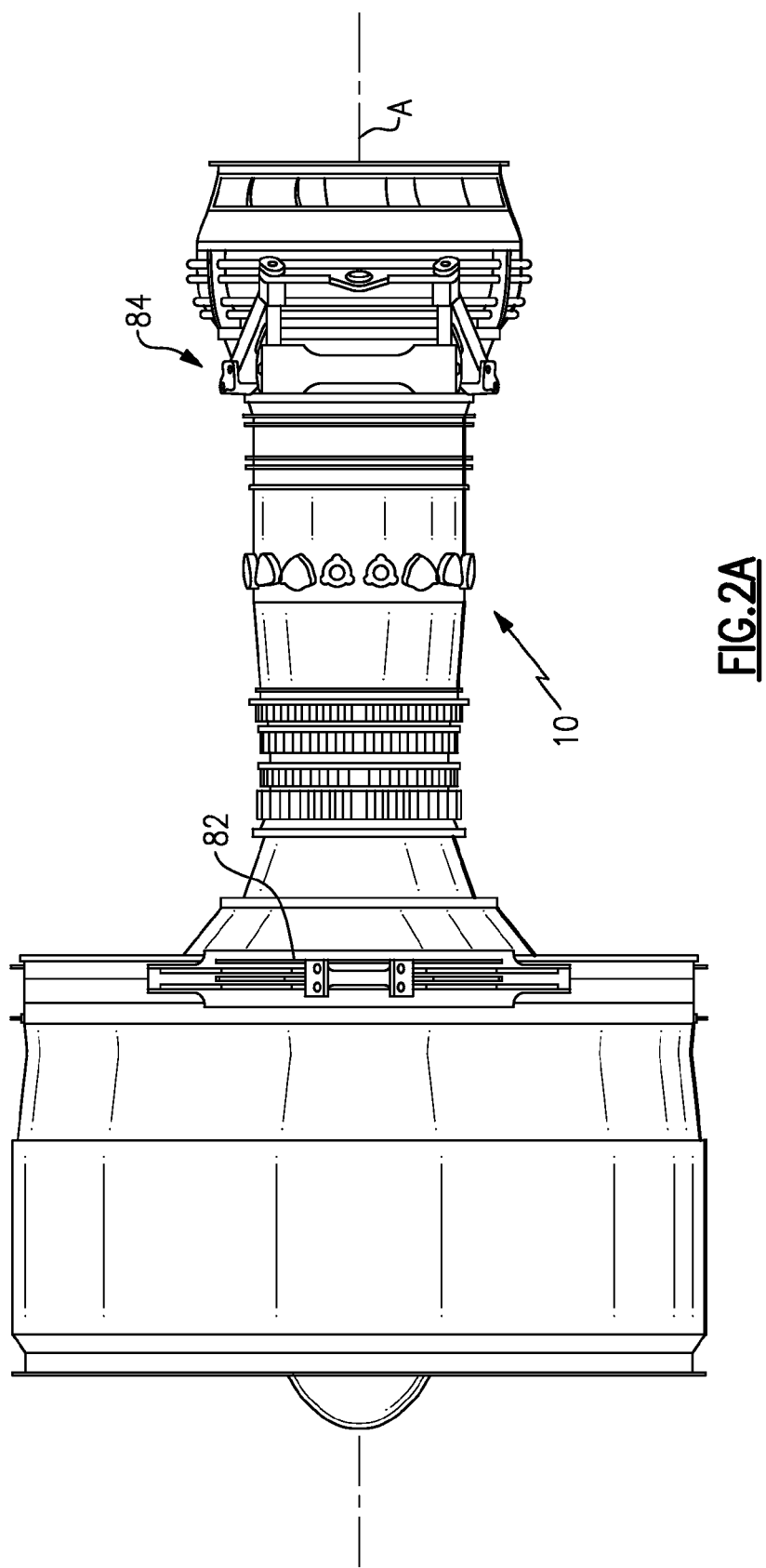
FIG. 2A is a top view of an engine mount system.

The turbofan gas turbine engine 10 is mounted to aircraft structure such as an aircraft wing through a mount system 80 attachable by the pylon 12. The mount system 80 includes a forward mount 82 and an aft mount 84 (FIG. 2A). The forward mount 82 is secured to the IMC 48 and the aft mount 84 is secured to the MTF 70 at the thrust case 52C. The forward mount 82 and the aft mount 84 are arranged in a plane containing the axis A of the turbofan gas turbine 10. This eliminates the thrust links from the intermediate case, which frees up valuable space beneath the core nacelle and minimizes IMC 48 distortion.

Figure 2B:
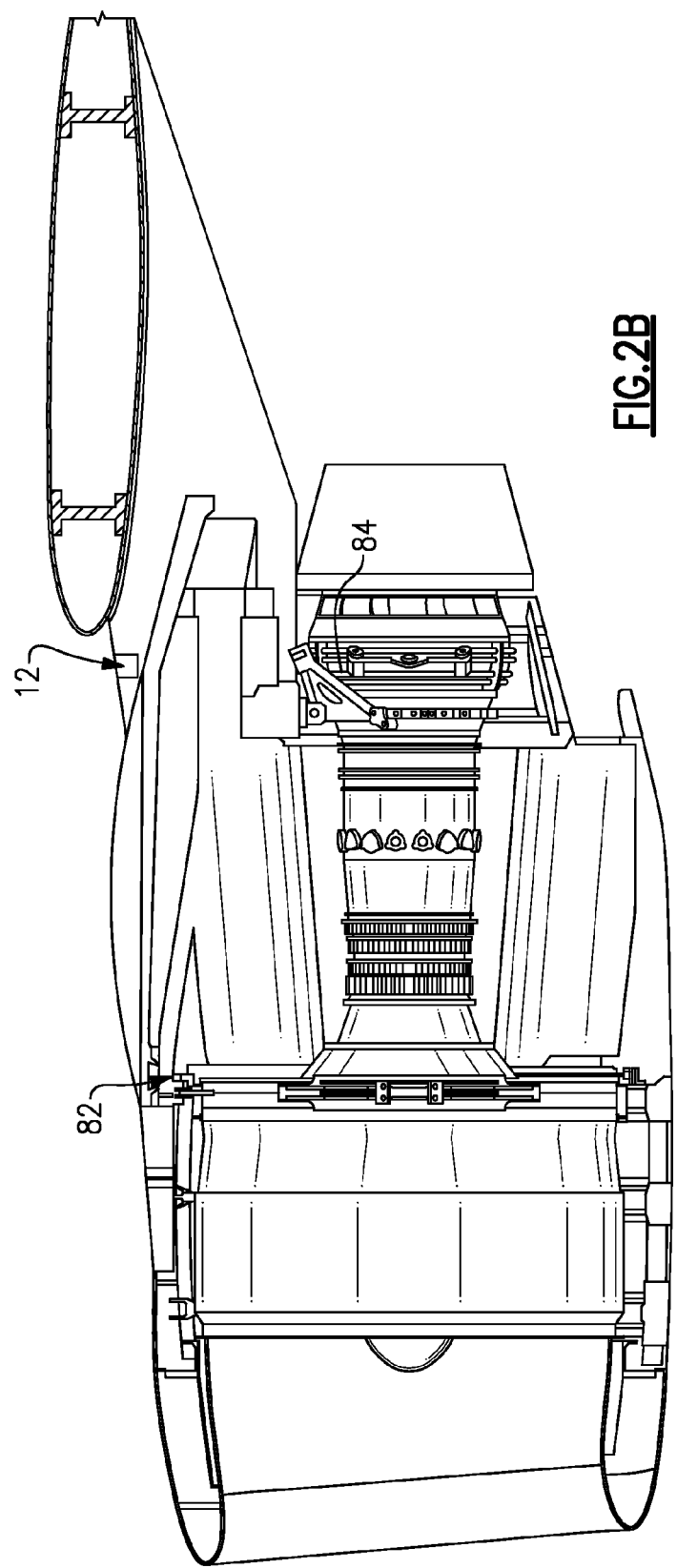
FIG. 2B is a side view of an engine mount system within a nacelle system.
Figure 2C:
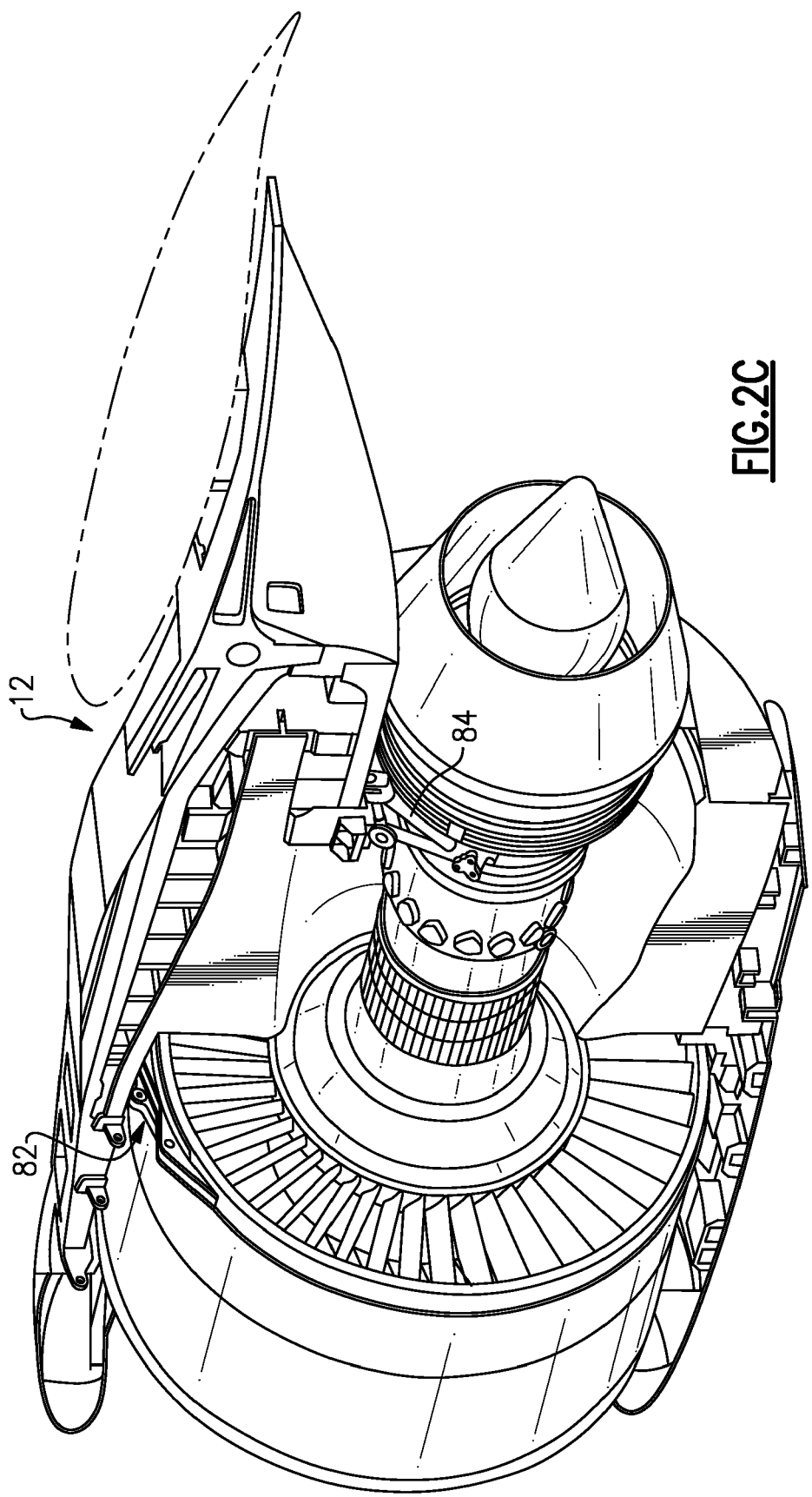
FIG. 2C is a forward perspective view of an engine mount system within a nacelle system.

Referring to FIGS. 2A-2C, the mount system 80 reacts the engine thrust at the aft end of the engine 10. The term "reacts" as utilized in this disclosure is defined as absorbing a load and dissipating the load to another location of the gas turbine engine 10.

Figure 3:
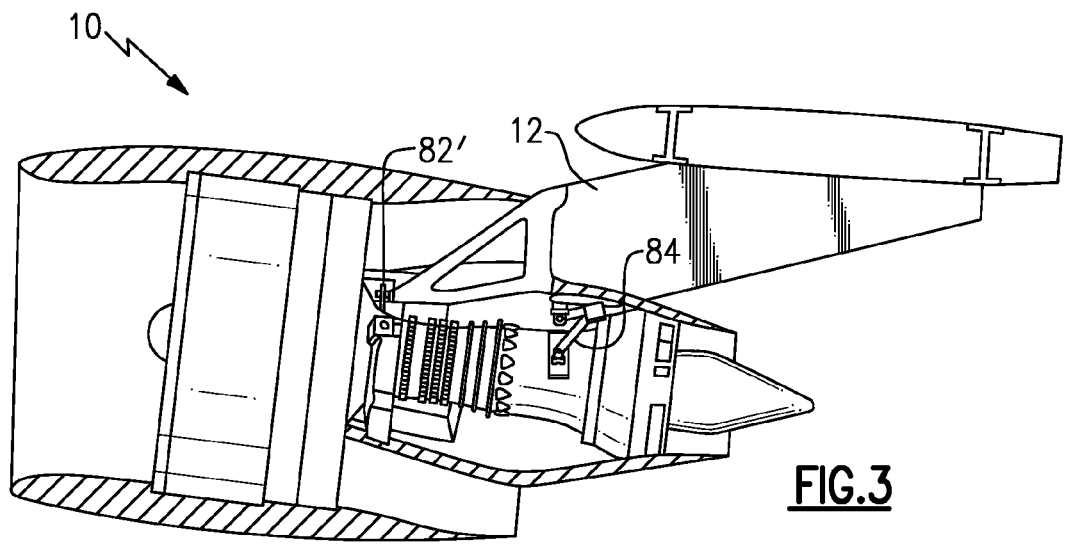
FIG. 3 is a side view of an engine mount system within another front mount.

The forward mount 82 supports vertical loads and side loads. The forward mount 82 in one non-limiting embodiment includes a shackle arrangement which mounts to the IMC 48 at two points 86A, 86B. The forward mount 82 is generally a plate-like member which is oriented transverse to the plane which contains engine axis A. Fasteners are oriented through the forward mount 82 to engage the intermediate case (IMC) 48 generally parallel to the engine axis A. In this illustrated non-limiting embodiment, the forward mount 82 is secured to the IMC 40. In another non-limiting embodiment, the forward mount 82 is secured to a portion of the core engine, such as the high-pressure compressor case 50 of the gas turbine engine 10 (see FIG. 3). One of ordinary skill in the art having the benefit of this disclosure would be able to select an appropriate mounting location for the forward mount 82.

Figure 4A:
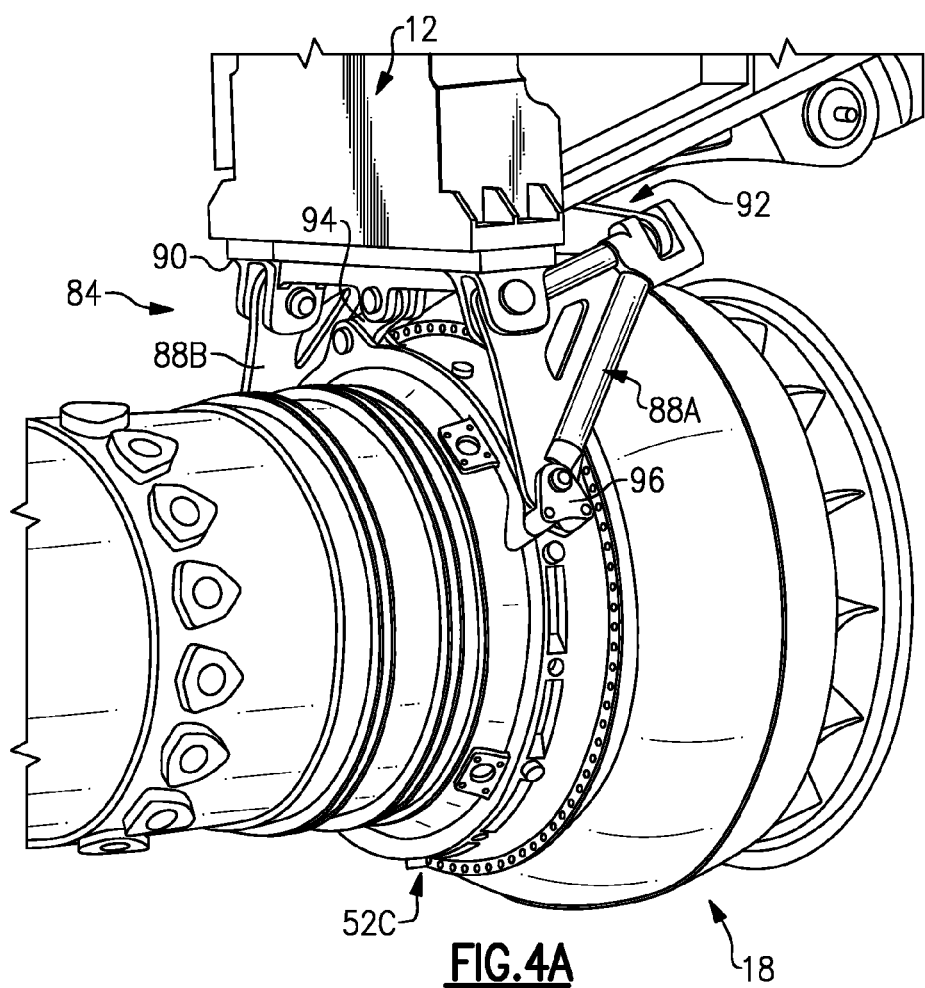
FIG. 4A is an aft perspective view of an aft mount.

Referring to FIG. 4A, the aft mount 84 generally includes a first A-arm 88A, a second A-arm 88B, a rear mount platform 90, a wiffle tree assembly 92 and a drag link 94. The rear mount platform 90 is attached directly to aircraft structure such as the pylon 12. The first A-arm 88A and the second A-arm 88B mount between the thrust case 52C at case bosses 96 which interact with the MTF 70 (FIGS. 4B-4C), the rear mount platform 90 and the wiffle tree assembly 92. It should be understood that the first A-arm 88A and the second A-arm 88B may alternatively mount to other areas of the engine 10 such as the high pressure turbine case or other cases. It should also be understood that other frame arrangements may alternatively be used with any engine case arrangement.

Figure 4B:
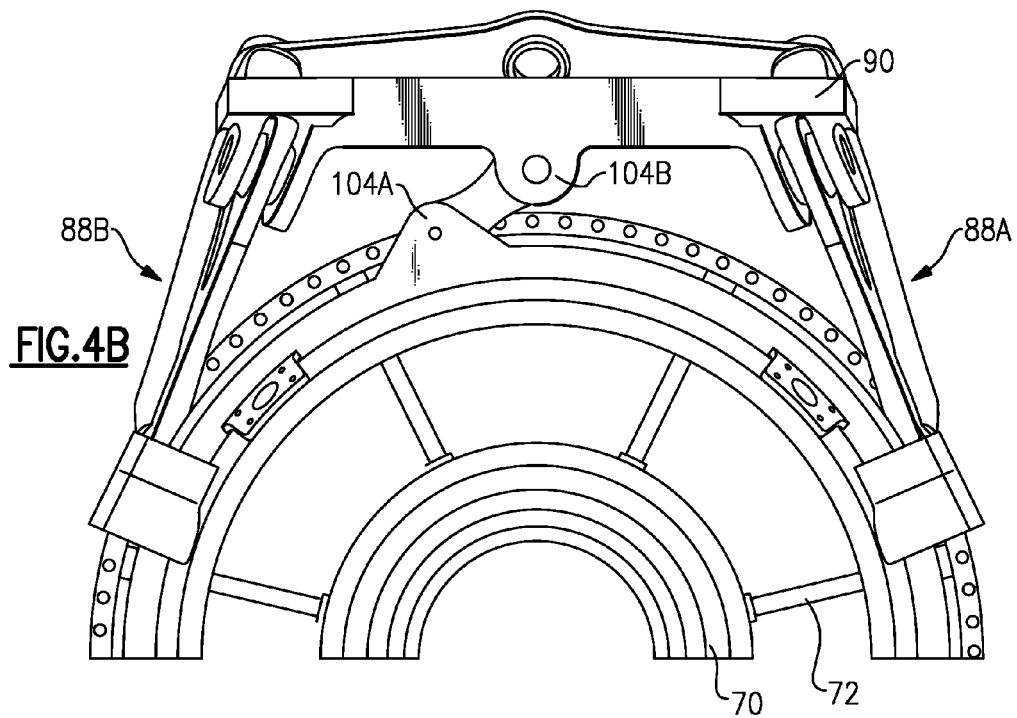
FIG. 4B is an aft view of an aft mount of FIG. 4A.
Figure 4C:
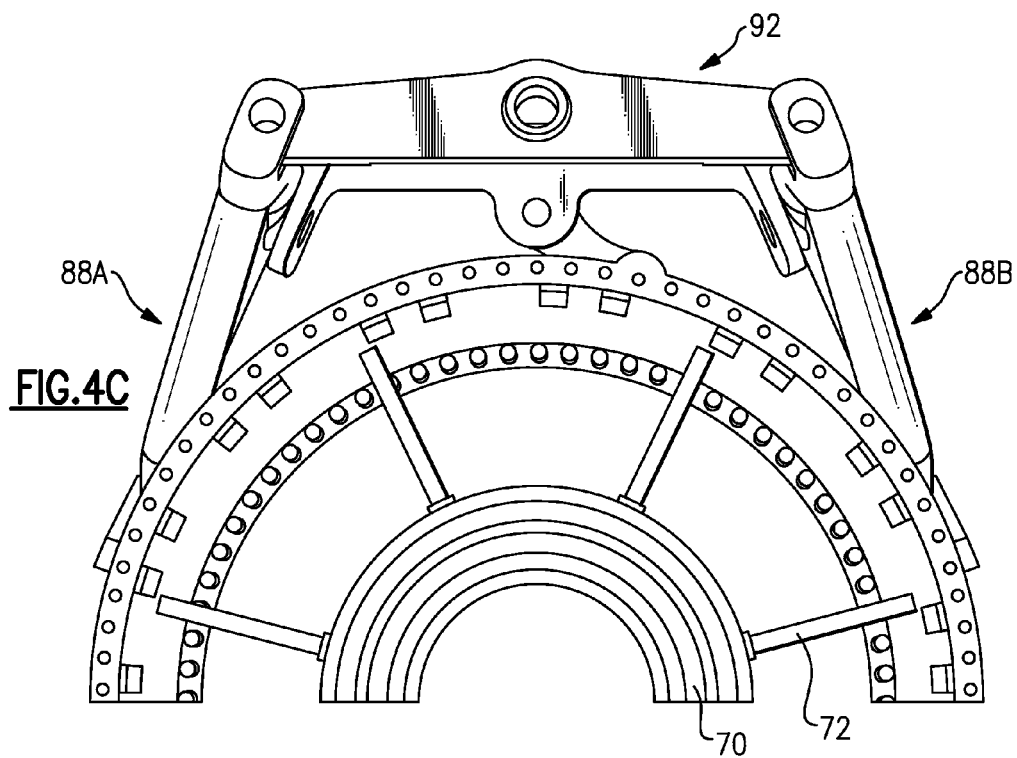
FIG. 4C is a front view of the aft mount of FIG. 4A.
Figure 4D:
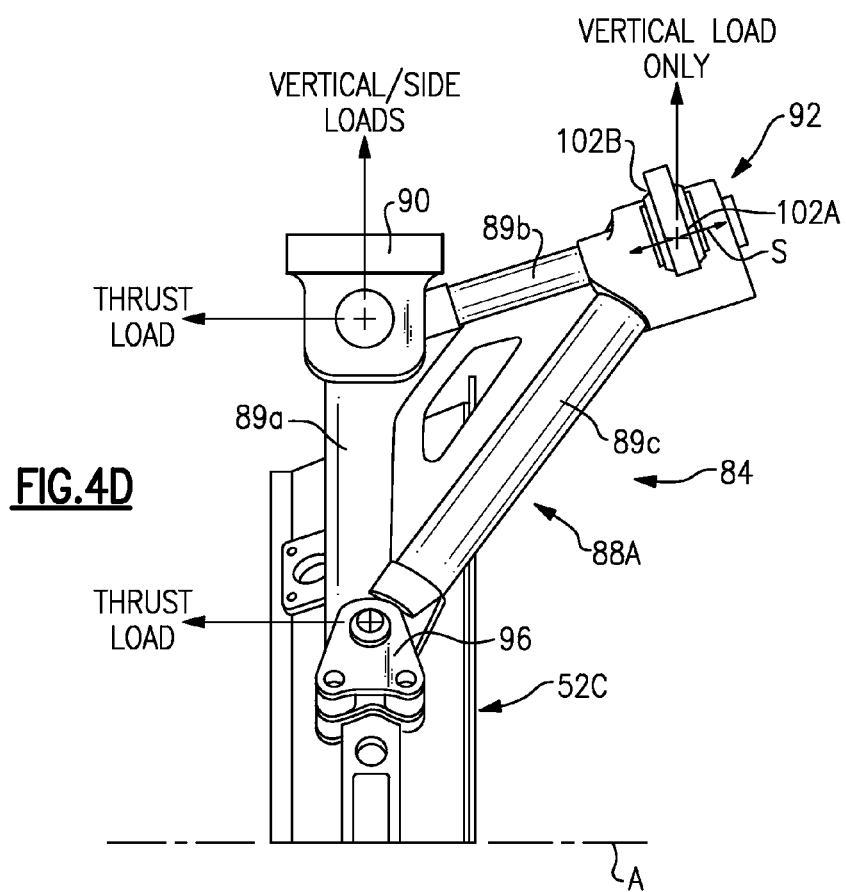
FIG. 4D is a side view of the aft mount of FIG. 4A.

Referring to FIG. 4D, the first A-arm 88A and the second A-arm 88B are rigid generally triangular arrangements, each having a first link arm 89$a$, a second link arm 89$b$ and a third link arm 89$c$. The first link arm 89$a$ is between the case boss 96 and the rear mount platform 90. The second link arm 89$b$ is between the case bosses 96 and the wiffle tree assembly 92. The third link arm 89$c$ is between the wiffle tree assembly 92 rear mount platform 90. The first A-arm 88A and the second A-arm 88B primarily support the vertical weight load of the engine 10 and transmit thrust loads from the engine to the rear mount platform 90.

The first A-arm 88A and the second A-arm 88B of the aft mount 84 force the resultant thrust vector at the engine casing to be reacted along the engine axis A which minimizes tip clearance losses due to engine loading at the aft mount 84. This minimizes blade tip clearance requirements and thereby improves engine performance.

Figure 4E:
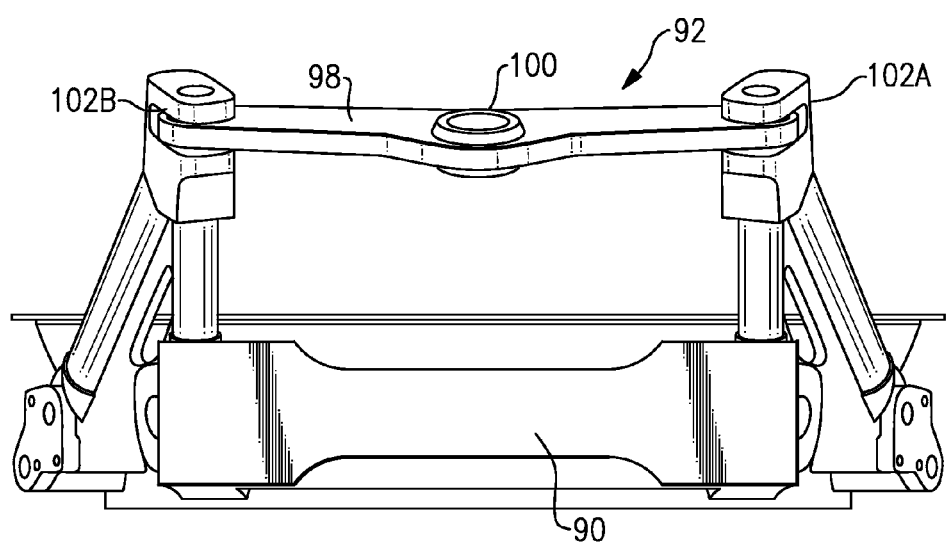
FIG. 4E is a top view of the aft mount of FIG. 4A.
Figure 5A:
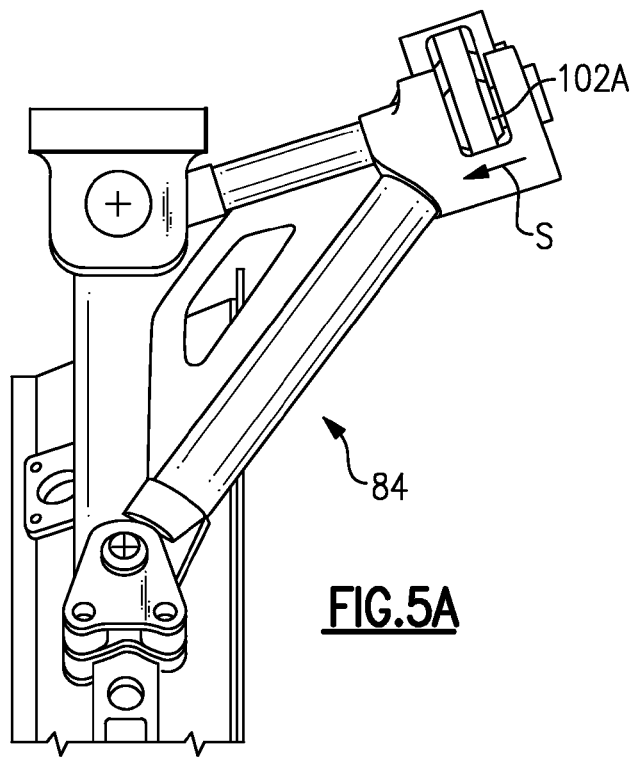
FIG. 5A is a side view of the aft mount of FIG. 4A in a first slide position.
Figure 5B:
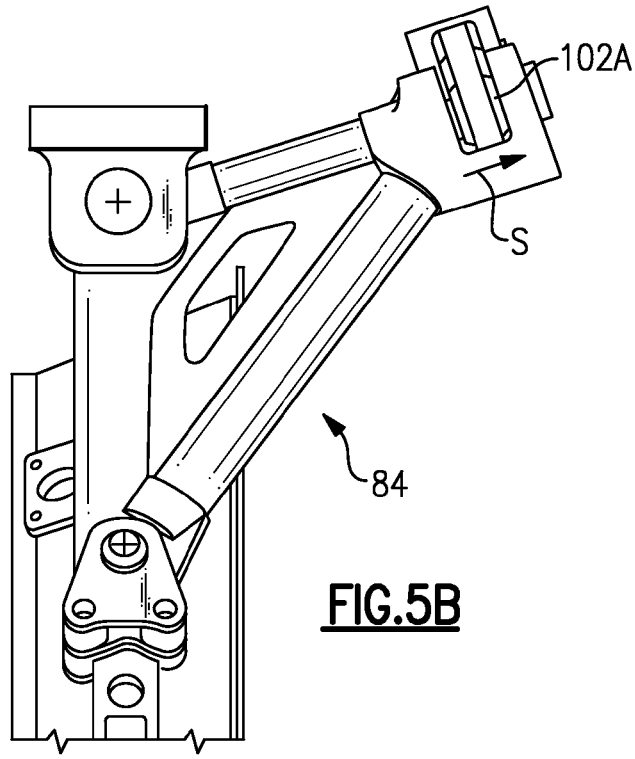
FIG. 5B is a side view of the aft mount of FIG. 4A in a second slide position.

The wiffle tree assembly 92 includes a wiffle link 98 which supports a central ball joint 100, a first sliding ball joint 102A and a second sliding ball joint 102B (FIG. 4E). It should be understood that various bushings, vibration isolators and such like may additionally be utilized herewith. The central ball joint 100 is attached directly to aircraft structure such as the pylon 12. The first sliding ball joint 102A is attached to the first A-arm 88A and the second sliding ball joint 102B is mounted to the first A-arm 88A. The first and second sliding ball joint 102A, 102B permit sliding movement of the first and second A-arm 88A, 88B (illustrated by arrow S in FIGS. 5A and 5B) to assure that only a vertical load is reacted by the wiffle tree assembly 92. That is, the wiffle tree assembly 92 allows all engine thrust loads to be equalized transmitted to the engine pylon 12 through the rear mount platform 90 by the sliding movement and equalize the thrust load that results from the dual thrust link configuration. The wiffle link 98 operates as an equalizing link for vertical loads due to the first sliding ball joint 102A and the second sliding ball joint 102B. As the wiffle link 98 rotates about the central ball joint 100 thrust forces are equalized in the axial direction. The wiffle tree assembly 92 experiences loading only due to vertical loads, and is thus less susceptible to failure than conventional thrust-loaded designs.

The drag link 94 includes a ball joint 104A mounted to the thrust case 52C and ball joint 104B mounted to the rear mount platform 90 (FIGS. 4B-4C). The drag link 94 operates to react torque.

The aft mount 84 transmits engine loads directly to the thrust case 52C and the MTF 70. Thrust, vertical, side, and torque loads are transmitted directly from the MTF 70 which reduces the number of structural members as compared to current in-practice designs.

The mount system 80 is compact, and occupies space within the core nacelle volume as compared to turbine exhaust case-mounted configurations, which occupy space outside of the core nacelle which may require additional or relatively larger aerodynamic fairings and increase aerodynamic drag and fuel consumption. The mount system 80 eliminates the heretofore required thrust links from the IMC, which frees up valuable space adjacent the IMC 48 and the high pressure compressor case 50 within the core nacelle C.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine comprising:
   a turbine section;
   a fan section;
   an epicyclic gear train;
   a spool connecting said turbine section and said epicyclic gear train such that said fan section is rotatable with said turbine section through said epicyclic gear train;
   a static structure supporting said turbine section and said fan section;
   a mount including a mount platform, a wiffle tree assembly, a first A-arm mounted to said mount platform and said wiffle tree assembly and a second A-arm mounted to said mount platform and said wiffle tree assembly.

2. The gas turbine engine as recited in claim 1, wherein said wiffle tree assembly includes a wiffle link supporting a ball joint, a first sliding ball joint and a second sliding ball joint.

3. The gas turbine engine as recited in claim 2, wherein said ball joint is between said first sliding ball joint and said second sliding ball joint.

4. The gas turbine engine as recited in claim 1, wherein said first A-arm is mounted to said mount platform through a first A-arm first ball joint, and said second A-arm is mounted to said mount platform through a second A-arm ball joint.

5. The gas turbine engine as recited in claim 1, wherein said first A-arm is mounted to said wiffle tree assembly through a first sliding ball joint, and said second A-arm is mounted to said wiffle tree assembly through a second sliding ball joint.

6. The gas turbine engine as recited in claim 1, wherein said first A-arm and said second A-arm each comprise rigid generally triangular arrangement.

7. The gas turbine engine as recited in claim 1, further comprising a drag link including a first ball joint mounted to said static structure and a second ball joint mounted to said mount platform, said drag link reacting torque.

8. The gas turbine engine as recited in claim 1, wherein said static structure comprises an engine case.

9. The gas turbine engine as recited in claim 1, wherein said static structure comprises an engine case.

10. The gas turbine engine as recited in claim 1, wherein said mount is an aft mount, and further comprising a forward mount forward of said aft mount with regard to an engine central axis.

11. The gas turbine engine as recited in claim 1, wherein said epicyclic gear train has a gear reduction ratio of greater than 2.5:1.

12. The gas turbine engine as recited in claim 1, further comprising a compressor section, said compressor section being arranged to receive a core airflow, and said fan section defines a bypass ratio with regard to said core airflow that is greater than 10:1.

* * * * *